UNITED STATES PATENT OFFICE.

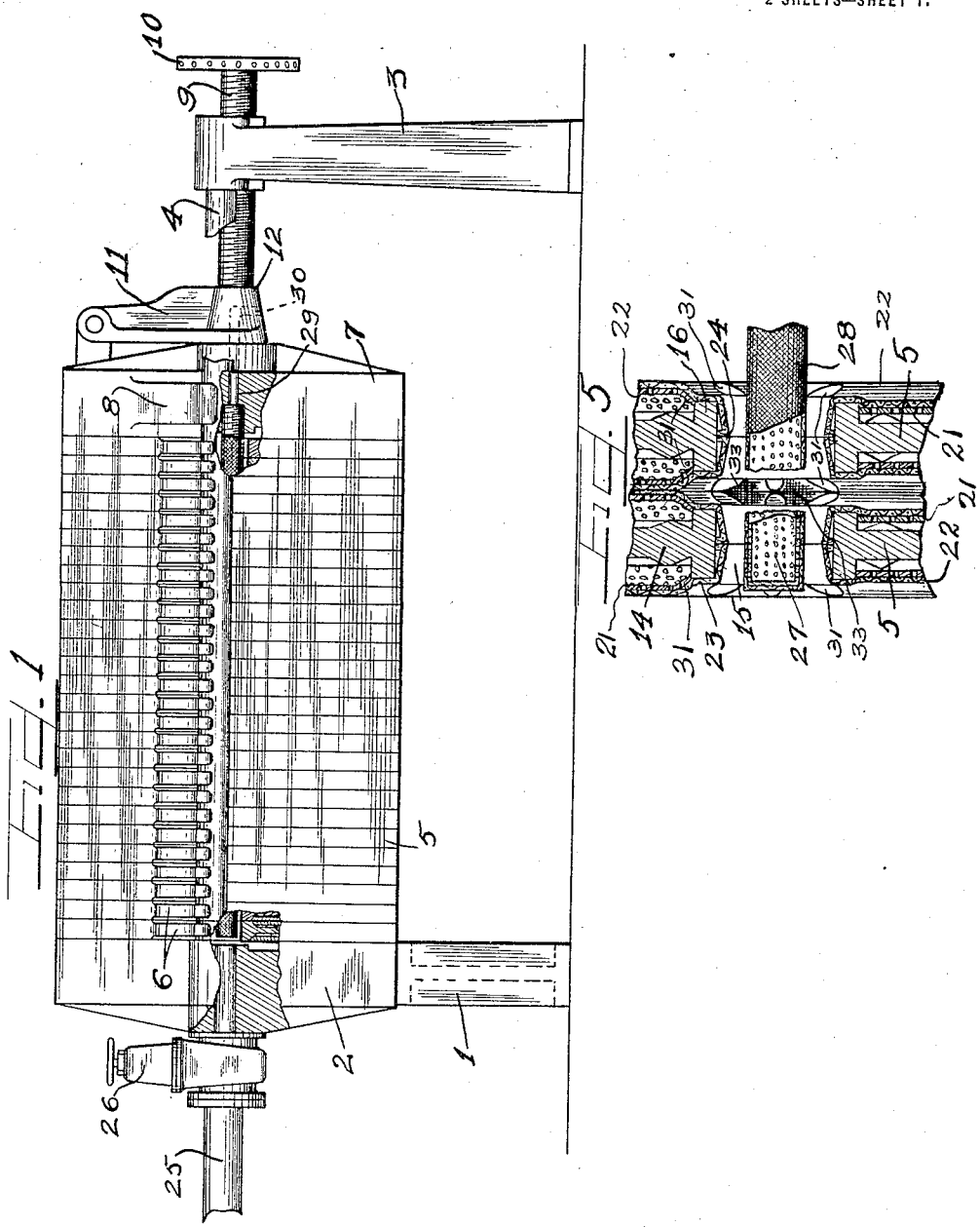

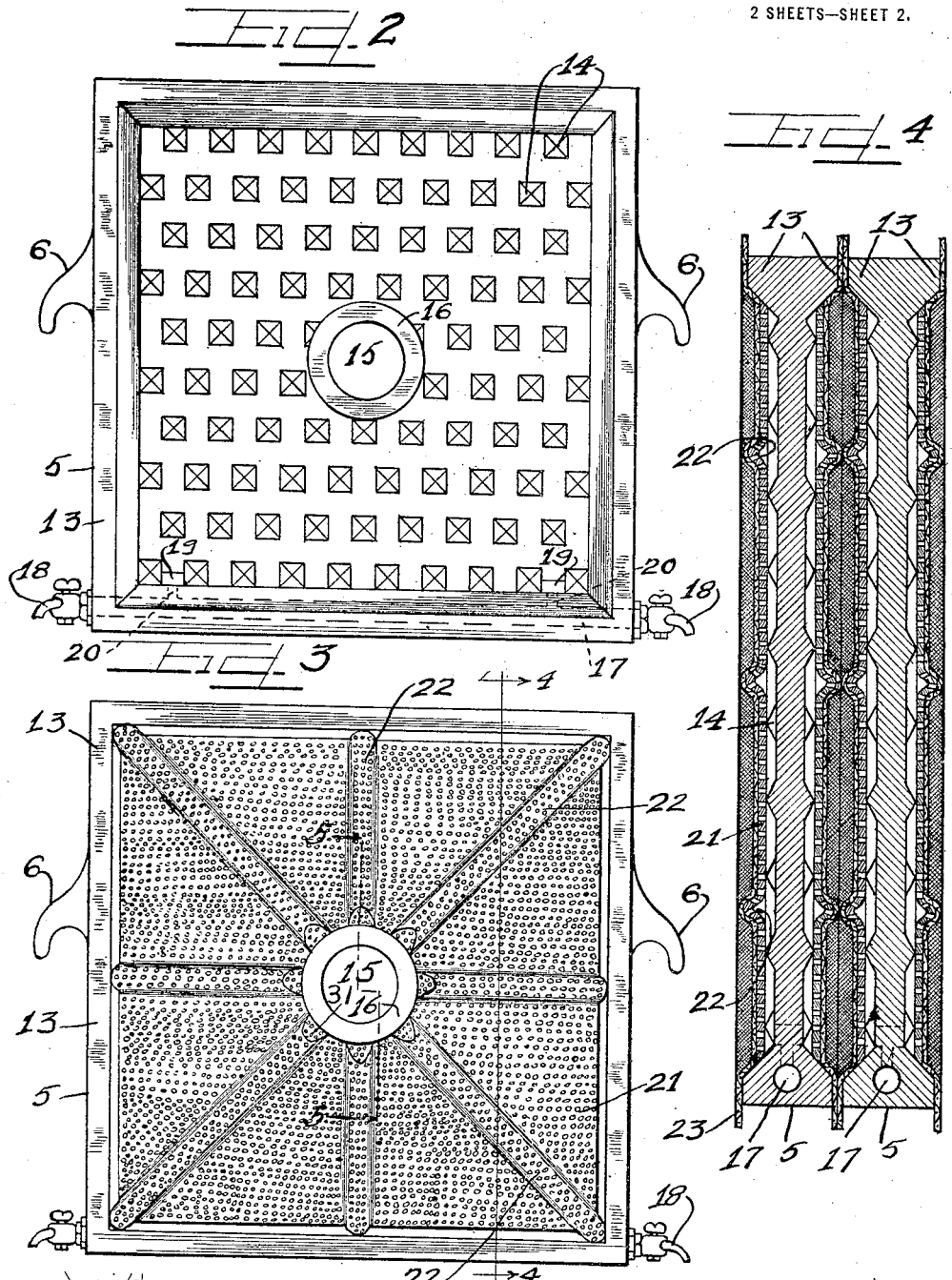

WILLIAM BUCKLEY, OF CHICAGO, ILLINOIS.

SLUDGE-PRESS.

1,316,419.          Specification of Letters Patent.     Patented Sept. 16, 1919.

Application filed March 19, 1918. Serial No. 223,345.

*To all whom it may concern:*

Be it known that I, WILLIAM BUCKLEY, a citizen of the United States, and a resident of the city of Chicago, in the county of Cook and State of Illinois, have invented certain new and useful Improvements in Sludge-Presses; and I do hereby declare that the following is a full, clear, and exact description of the same, reference being had to the accompanying drawings, and to the numerals of reference marked thereon, which form a part of this specification.

My invention has reference more particularly to a sludge press wherein the space intermediate of the plates is divided into a number of compartments each of which has separate drainage facilities to insure uniform and effective extraction of moisture from the entire mass of material treated and which form the material into small cakes which can be easily handled without danger of breakage.

In sludge presses in which the ordinary type of filter plate is employed, the drainage is not uniform and extraction of moisture from certain portions of the material is retarded. This results in slow and unequal drying, and the resultant cake of filtered material has soggy or wet portions which do not hold their form when removed from the filter press, and cause the cake of material to break in handling, and moreover, the large cake of material resulting from the use of the ordinary filter plate is particularly difficult to handle without breaking.

It is an object of my invention to provide a sludge press wherein the cake of filtered material is divided into sections which are small enough to be readily handled without danger of breakage, and wherein each section is effectively drained independently of the other sections so that the entire cake of filtered material is thoroughly and uniformly dried.

It is a further object of my invention to provide a filter plate with a strainer plate separated therefrom so as to form an intermediate drainage space, and having division members extending above the surface of the drainage plate to divide the surface of the strainer plate into sections, each of which drains independently into the intermediate drainage space.

Another object of my invention is to provide filter plates with strainer plates, which are separated therefrom to provide a drainage space therebetween, and wherein the strainer plates have matching outwardly extending ribs or corrugations which divide the space intermediate of the filter plates into separate compartments, each of which is independently drained through the strainer plate into the drainage space.

My invention also has other important objects which will appear from the following specification and the accompanying drawings which illustrate and describe a preferred form of my invention.

On the drawings:—

Figure 1 is a side view of a filter press embodying my improvements and having portions broken away to show details of construction.

Fig. 2 is a face view of one of the filter press plates.

Fig. 3 is a similar view showing the filter plate with the strainer plate thereon.

Fig. 4 is an enlarged section view on the line 4—4 of Fig. 3, showing a pair of filter plates assembled ready for use.

Fig. 5 is an enlarged sectional view of central portions of adjoining filter plates and the central drainage pipe, said view being taken on the line 5—5 of Fig. 3.

As shown on the drawings:

The reference numeral 1, indicates a standard, which supports the stationary filter press head 2, and 3, is another standard which is spaced therefrom and connected with the stationary filter press head 2, by means of a pair of parallel rods 4, which are suitably spaced to support the filter plates therebetween and suitably connected to hold the standard 3, and filter head 2, from separation.

The reference numeral 5, indicates the filter plates, a number of which are supported side by side on the rods 4, so as to be clamped against the filter head 2, and in the present illustration, these plates are indicated as rectangular in form but obviously they may be of any suitable shape, and each has a hook shaped bracket 6, at each side thereof to engage and slide on the rods 4, so as to support the filter plate thereon. There is also a sliding filter press head 7, which is similarly provided with a hook shaped bracket 8, at each side thereof whereby it is likewise mounted on the rods 4, and is adapted to be operated to clamp the filter press plates 5, intermediate thereof, and the stationary filter head 2.

For applying pressure to the sliding filter press head 7, a screw 9, is threaded through the upper end of the standard 3, intermediate of the rods 4, and has a hand wheel 10, at the outer end thereof whereby the screw is operated, and there is a bearing member 11, pivoted on the outer face of the sliding head 7, which has a hub 12, positioned centrally of the said head and adapted to bear thereagainst and this hub is provided with a socket or otherwise formed to be engaged by the inner end of the screw 9, to clamp the filter plates in close engagement.

Each filter plate 5, has a surrounding flange 13, extending at each side thereof and which is adapted to engage corresponding flanges of the adjoining filter press plates to provide a space between the plates for material to be filtered and at each side of the plate the surface thereof is formed with a plurality of projections 14, for purposes hereafter explained. There is also a central opening 15, in each plate surrounded by a hub or flange 16, which is of less width than the flange 13, at the edge of the plate so that when the plates are clamped together, there is a space between the hubs 16, of the adjoining sections whereby material to be filtered may be supplied through the openings 15, and between the hubs 16, into the compartment formed between the adjoining plates.

The flange 13, at the lower edge of each plate has a channel 17, extending longitudinally therethrough and there is a valve 18, at each end of this channel whereby the liquid which drains out of the material intermediate of the filter plates may be drawn off. To afford communication to the channels 17, there are the openings or slots 19, through the filter plate, at the bottom thereof which open to both sides of the filter plate, and these slots connect through the passageways 20, with the channel 17, so that the liquid from the material intermediate of the filter plate drains into the channel 17.

The reference numeral 21, indicates a strainer plate which may be perforated as shown or otherwise constructed, and which fits inside the flange 13, of the filter plate, and is held at a distance from the surface of the filter plate by the projections or bosses 14, thereon so as to provide a space intermediate of the strainer plate and filter plate into which the liquid is drained from the filtered material. Each strainer plate 21, is formed with matching corrugations or ribs 22, which may be arranged as shown or in any other desirable manner and these corrugations or ribs extend above the surface of the strainer plates 21, so as to coöperate with the corresponding ribs on the opposite strainer plate of the adjoining filter plate to divide the space intermediate thereof into a plurality of compartments each of which is in communication with the central opening 15, in the filter plate so as to have material to be filtered supplied to the said compartments. The inner ends of these corrugations are beveled or bent down as at 31, to engage against the hub 16, and close the opening through the corrugation and there is a flat opening 33, formed between the hubs 16 of adjoining plates and between the inner ends of adjoining corrugations 22, which serves as a passageway to admit material to be filtered from the central opening 15, into each of the compartments formed by the ribs 22, between the adjoining plates 14; and the outer ends of the corrugations are fitted against the flange 13, of the plate 5, to make a close joint.

In operation, the strainer plates 21, are placed in position and a filter cloth 23, may then be laid thereon, and allowed to project beyond the flanges 13, of the filter plates, so as to be clamped between the plates when they are pressed together, and these filter cloths have a central opening, the edges of which may be secured to the hub of the filter plate in any suitable manner. In the present instance, the edges of the filter cloths on opposite sides of the filter plates are turned into the openings 15, and have the edges united as at 24, as this is a convenient manner in which the inner edges may be secured.

A pipe 25, is connected through a valve 26, at the center of the stationary filter head 2, in line with the openings 15, in the filter plates when placed in position, and is adapted to supply the material, which is in liquid form for treatment, in the filter press. An auxiliary drainage tube 27, may also be provided which is connected at one end with the movable filter head 7, in position to be inserted through the openings 15, in the filter plates, and extends to the opposite end of the filter press, and is adapted to drain off some of the liquid from the material to be filtered as it is supplied to the filter press and before it is forced in between the filter plates. This pipe 27, is perforated as shown, and closed at the outer end, and there is a covering of filtering fabric 28, enveloping this filter pipe. The filter head 7, is provided with a passageway 29, which registers with a passageway 30, in the hub 12, to provide an outlet for liquid which is drained into the tube 27.

The operation is as follows:

A plurality of filter plates having a strainer plate 21, at each side thereof, and enveloped in the filter fabric, as shown, are mounted upon the rods 4, intermediate of the filter heads 2 and 7, and are then clamped together by means of the screw 9, so as to form a tight compartment. The valve 26, is then opened to permit the material to be filtered to be forced into the filter press, and this material travels through the openings 15, in the filter plates around the pipe 27, which to some extent drains off the liquid from the material to be filtered, and the pressure on the material forces the material through the passageways 33, between the spaced hubs 16, into the space intermediate of the filter plates and strainer plates 21, each of the latter of which is covered on the outer face with the filter cloth 23. On account of the pressure with which the material to be filtered is supplied, the material is forced compactly into the space intermediate of the strainer plates, and the liquid therein is readily pressed out and passes through the filter cloth 23, and the strainer plates 21, into the space intermediate of the strainer plates 21 and the filter plates 5, and drains downwardly to the bottom of the filter plate and is drawn off through the passageway 17.

Thus it will be seen that each compartment formed by the corrugations or ribs 22, drains independently of the other compartments and permits effective and uniform extraction of moisture from the material so that the entire cake of material is uniformly dried. This makes a cake which is less liable to be broken in handling, and furthermore, on account of the ribs or corrugations 22, the cake is divided up into a number of small sections, which may be easily handled without danger of breakage.

After the filter press has been entirely filled and the material dried sufficiently therein, the screw 9, is released and the filter plates separated, and the cakes or sections of filtered material removed therefrom, after which the press is made ready for another operation.

While I have shown and described my invention in a certain form, I am aware that various changes and modifications may be made without departing from the principles of my invention and I therefore do not purpose limiting the patent granted hereon otherwise than necessitated by the prior art.

I claim as my invention:

1. The combination with a filter press plate of a removable strainer plate thereon having outwardly extending ribs for dividing the surface of the strainer plate on which the sludge collects into separate sections.

2. The combination of a filter press plate and a strainer plate thereon having a drainage space therebetween, said strainer plate being provided with ribs on the outer face thereof for dividing the surface thereof on which the sludge collects into a plurality of sections.

3. The combination with a filter press plate and adjoining strainer plate of a plurality of interposed members for spacing said plates to provide a drainage space therebetween, said strainer plate being provided with a plurality of corrugations extending outwardly therefrom to divide the surface thereof on which the sludge collects into a plurality of sections.

4. The combination of a filter press plate, a strainer plate adjacent and spaced from the filter press plate to provide a drainage space therebetween, registering openings in said plates for introducing the material to be filtered onto the outer face of the strainer plate and ribs radiating from the opening therein to divide the surface of the strainer plate into separate sections, each communicating with the said opening.

5. The combination of a pair of filter press plates, a peripheral flange for spacing the plates to provide an intermediate compartment for material to be treated, a pair of strainer plates intermediate of the filter press plates having a drainage space at one side thereof for the liquid drained from the material in the compartment, and ribs on the other side of the strainer plates for dividing the compartment for the material into separate sections.

6. The combination with a filter press plate having a surrounding flange, a strainer plate held against the filter press plate and embraced by the flange, a plurality of projections intermediate of and separating the plates to provide a drainage space therebetween, registering openings in the said plates for supplying material to be filtered, and a plurality of ribs on the outer face of the strainer plate extending from the opening therein to the flange of the filter press plate to divide the surface of the strainer plate into separate sections each communicating with the said opening.

7. The combination with a filter press plate having a surrounding flange, of a strainer plate embraced by the flange and separated from the filter press plate to provide a drainage space therebetween, a drainage outlet from the space intermediate of the said plates, registering openings in the said plates for supplying material to be filtered, a plurality of ribs on the outer face of the strainer plate extending from the openings therein to divide the surface of the strainer plate into separate sections communicating with the said openings, and a filter fabric on the outer surface of said strainer plate.

8. In a filter press, the combination of a pair of filter press plates, a peripheral annular flange intermediate of and separating the plates to provide a compartment therebetween, a strainer plate on each filter press plate embraced by the flange, and spaced from the filter plate to provide a drainage space therebetween, at each side of the compartment, registering openings in said plates for supplying material to be filtered, matching ribs on the outer face of each strainer plate extending from the opening therein so as to divide said compartment into a plurality of separate sections, each communicating with the said opening, and drainage outlet means in each filter plate communicating with the space intermediate of the filter press plate and the strainer plate.

9. In a filter press, the combination of a pair of filter press plates, a marginal flange intermediate of and separating the plates to provide a compartment therebetween, a strainer plate at each side of the compartment adjoining and spaced from a filter plate to provide a drainage space therebetween, drainage outlet means for said space, matching ribs on the outer face of each strainer plate for dividing the space intermediate of the strainer plates into a plurality of compartments, and a filter fabric covering each strainer plate.

10. In a filter press, the combination of a pair of filter press plates, each having a marginal flange separating the filter press plates to provide a compartment therebetween, a strainer plate at each side of the compartment adjacent a filter press plate, means for spacing each strainer plate from its adjacent filter press plate to provide a drainage space therebetween, a drainage outlet from each space, registering openings in the filter press plates and strainer plates for supplying material to be filtered intermediate of the strainer plates, and matching ribs on the strainer plates in each compartment extending from the opening thereof, so as to divide the space intermediate of the strainer plates into a plurality of compartments each communicating with the said opening.

11. In a filter press, the combination of a pair of filter press plates, a marginal flange for spacing the filter plates to provide a compartment therebetween, a strainer plate at each side of the compartment on the adjacent filter press plate, means for spacing each strainer plate from its adjacent filter press plate to provide a drainage space therebetween, an outlet from said space, matching corresponding ribs on the face of each strainer plate for dividing the compartment therebetween into separate sections, a filter fabric covering each strainer plate, and registering openings in the filter press plate, strainer plate and filter fabric for supplying material to be filtered to said compartments.

In testimony whereof I have hereunto subscribed my name in the presence of two subscribing witnesses.

WILLIAM BUCKLEY.

Witnesses:
　CHARLES W. HILLS, Jr.,
　FRED E. PAESLER.

Copies of this patent may be obtained for five cents each, by addressing the "Commissioner of Patents, Washington, D. C."